(No Model.)
J. MURRAY.
AIR COOLING APPARATUS.
No. 512,987. Patented Jan. 16, 1894.
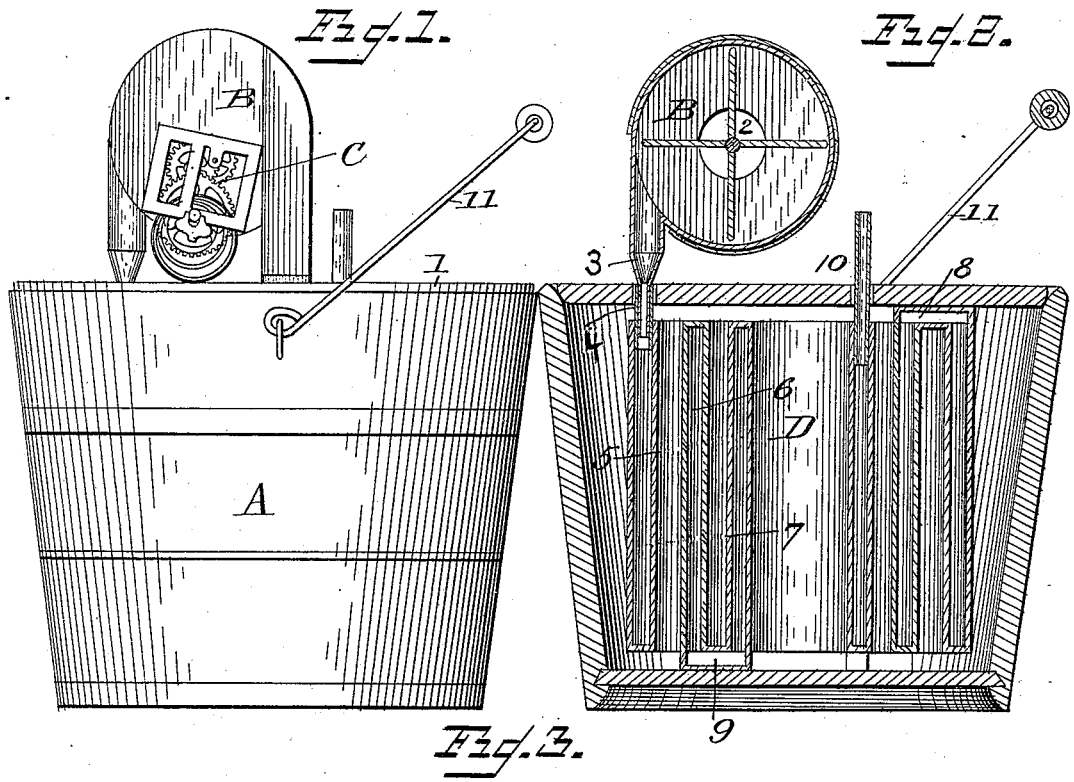
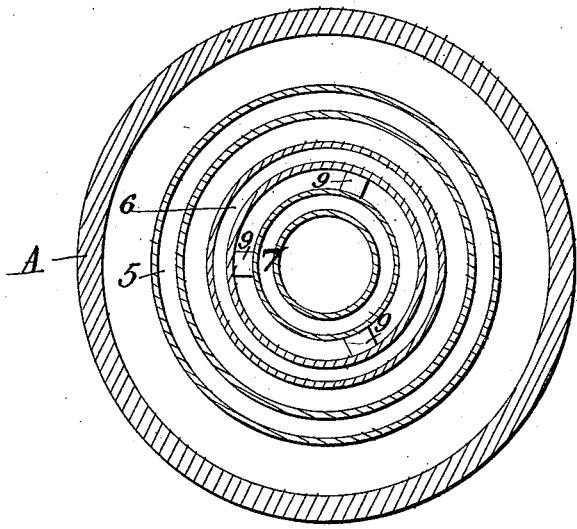
WITNESSES
F. L. Ourand
Edwin McKee
INVENTOR:
James Murray,
By S. C. Fitzgerald
Attorney.
THE NATIONAL LITHOGRAPHING COMPANY,
WASHINGTON, D. C.

UNITED STATES PATENT OFFICE.

JAMES MURRAY, OF BALDWIN, KANSAS.

AIR-COOLING APPARATUS.

SPECIFICATION forming part of Letters Patent No. 512,987, dated January 16, 1894.

Application filed August 14, 1893. Serial No. 483,158. (No model.)

*To all whom it may concern:*

Be it known that I, JAMES MURRAY, a citizen of the United States, residing at Baldwin, in the county of Douglas, State of Kansas, have invented certain new and useful Improvements in Air-Cooling Apparatus; and I do hereby declare the following to be a full, clear, and exact description of the invention, such as will enable others skilled in the art to which it appertains to make and use the same.

My invention relates to improvements in portable air-coolers.

The object of my invention is to produce an apparatus suitable for cooling the air of apartments during warm weather, and which will be simple, easily operated, portable and efficient.

My invention consists in such features of construction and combination of parts as will first be described in connection with the accompanying drawings, and then pointed out in the claim.

In the drawings—Figure 1 is a front elevation of a machine embodying my invention. Fig. 2 is a vertical section taken through the center of the apparatus. Fig. 3 is a horizontal sectional view of the same.

Referring to the drawings, A is a casing having a removable lid 1 on top of which is secured a blower or blast fan B constructed in the usual way and arranged to be operated by suitable clock-work C. The blower has an inlet 2 and an outlet 3, the latter being connected to a pipe 4, which communicates with an interior of an air-chamber D. This air-chamber consists of a series of concentric hollow annular air-chambers 5, 6, and 7, the chamber 5 being directly attached to the outlet-pipe 3, being also in communication with the next air-chamber 6 through the medium of upper connection pipes 8, the said air-chamber 6 being in communication with the inner air-chamber 7 by means of lower connecting-pipes 9, while the top of the air-chamber 7 is directly connected to an exhaust-pipe 10, which passes through the top or lid of the casing and opens into the air.

The operation of my invention is as follows: The casing is filled with ice and salt around and between the air-chambers, the lid which is preferably made in two halves so as to permit its removal without lifting off the blower and removing the air-chambers, is securely fastened, and the clock-mechanism of the blower being now wound up, the blower-fan will be revolved and a blast of air driven downward into the outer air-chamber 5, from where it passes to the middle air-chamber and from there to the inner air-chamber, and out through the exhaust-pipe into the room. In passing through these air-chambers the air is cooled by the melting ice, and, as a consequence the air coming out of the exhaust pipe will be of a much lower temperature than that being forced into the air-chambers, thus cooling the atmosphere as desired.

By providing the casing with a bail or handle, as shown at 11, my apparatus may be carried from room to room, when necessary.

Having thus fully described my invention, what I claim as new, and desire to secure by Letters Patent, is—

The herein described, portable air cooling apparatus, consisting essentially of the casing having a bail whereby it may be readily moved from place to place, the concentric hollow annular air chambers 5, 6, and 7, arranged in the casing and having spaces between them for the reception of a refrigerant, the induction tube 4, communicating with the outer chamber 5, and extending upwardly from the upper end thereof, the eduction tube 10, communicating with the inner chamber 7, extending upwardly from the upper end thereof, the horizontal pipes 8, arranged above and connecting the chambers 5, and 6, the horizontal pipes 9, arranged below and connecting the intermediate chamber 6, and the chamber 7, the removable lid having apertures for the passage of the induction and eduction tubes 4, 10, a blower casing arranged upon said lid and detachably connected to the tube 4, a rotary fan or blower arranged in the blower casing, and a clock work mechanism arranged upon the lid and connected with the shaft of the fan, the said mechanism being adapted, when wound up, to rotate the fan and thereby force the air through the chambers 5, 6, and 7, as and for the purpose set forth.

In testimony whereof I affix my signature in presence of two witnesses.

JAMES MURRAY.

Witnesses:
J. E. YOUNG,
M. M. HAIR.